(12) United States Patent
Nuske et al.

(10) Patent No.: US 10,217,013 B2
(45) Date of Patent: Feb. 26, 2019

(54) METHODS AND SYSTEM FOR DETECTING CURVED FRUIT WITH FLASH AND CAMERA AND AUTOMATED IMAGE ANALYSIS WITH INVARIANCE TO SCALE AND PARTIAL OCCLUSIONS

(71) Applicant: CARNEGIE MELLON UNIVERSITY, Pittsburgh, PA (US)

(72) Inventors: Stephen Thomas Nuske, Pittsburgh, PA (US); Zania Pothen, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 0 days.

(21) Appl. No.: 15/323,250

(22) PCT Filed: Jun. 30, 2015

(86) PCT No.: PCT/US2015/038534
§ 371 (c)(1),
(2) Date: Dec. 30, 2016

(87) PCT Pub. No.: WO2016/004026
PCT Pub. Date: Jan. 7, 2016

(65) Prior Publication Data
US 2018/0129894 A1   May 10, 2018

Related U.S. Application Data

(60) Provisional application No. 61/998,503, filed on Jun. 30, 2014.

(51) Int. Cl.
*G06K 9/20* (2006.01)
*G06K 9/46* (2006.01)
(Continued)

(52) U.S. Cl.
CPC ......... *G06K 9/2036* (2013.01); *G06K 9/4661* (2013.01); *G06K 9/4671* (2013.01);
(Continued)

(58) Field of Classification Search
None
See application file for complete search history.

(56) References Cited

U.S. PATENT DOCUMENTS 5,751,833 A    5/1998 Blit et al.
6,009,186 A  * 12/1999 Gorretta .................. G01N 21/94
                                              209/577

(Continued)

OTHER PUBLICATIONS

European Search Report for European Application 15815679.4 dated Dec. 20, 2017.

(Continued)

*Primary Examiner* — Idowu O Osifade
(74) *Attorney, Agent, or Firm* — Michael G. Monyok; David G. Oberdick

(57) ABSTRACT

This invention relates to a system and method for detecting the curved surfaces of fruit using a flash and camera system and automated image analysis. Lighting upon fruit is controlled, with a flash or multiple flashes positioned beside the camera illuminate the fruit. The flash causes a strong specular reflectance at the center of curved fruit (such as apples, grapes, or avocados, among others). From this point of specular reflectance, pixel intensity decreases steadily toward the edges of curved fruit. The method searches the images to find points of specular reflectance surrounded by curved shaded regions belonging to the curved fruit and can detect fruit of various sizes and scales within image.

17 Claims, 7 Drawing Sheets

(51) Int. Cl.
    *G06T 7/11*    (2017.01)
    *G06T 7/62*    (2017.01)
(52) U.S. Cl.
    CPC .................. *G06T 7/11* (2017.01); *G06T 7/62* (2017.01); *G06K 2209/17* (2013.01)

(56) References Cited

U.S. PATENT DOCUMENTS

2013/0325346 A1* 12/2013 McPeek ............. G01N 33/0098
                                                          702/2
2014/0279717 A1*  9/2014 Sagi-Dolev .......... G06N 3/0454
                                                          706/10

OTHER PUBLICATIONS

Wang, Q. et al. "Automated crop yield estimation for apple orchards." In Experimental robotics, pp. 745-758. Springer, Heidelberg, 2013.

Fernandez-Maloigne, C. et al. "Detection of apples with texture analyse for an apple picker robot." In Intelligent Vehicles' 93 Symposium, pp. 323-328. IEEE, 1993.

Costa, C. et al. "Quantitative evaluation of Tarocco sweet orange fruit shape using optoelectronic elliptic Fourier based analysis." Postharvest biology and Technology 54, No. 1 (2009): 38-47.

Kelman, E. E. et al. "Vision-based localisation of mature apples in tree images using convexity." Biosystems engineering 118 (2014): 174-185.

Rabatel, G. "Harvesting the Fruits of Vision (Machine Vision)" Image Process, European Technology Publishing, London, GB, vol. 6, No. 3 (1994): 24-26.

International Search Report and Written Opinion of the International Searching Authority for PCT Application PCT/US2015/038534 dated Oct. 1, 2015.

Nuske, Stephen, et al. "Yield estimation in vineyards by visual grape detection." In Intelligent Robots and Systems (IROS), 2011 IEEE/RSJ International Conference on, pp. 2352-2358. IEEE, 2011.

Plebe, Alessio, et al. "Localization of spherical fruits for robotic harvesting." Machine Vision and Applications 13, No. 2 (2001): 70-79.

Wang, Qi, Set al. "Automated crop yield estimation for apple orchards." In Proc. Int'l Symposium on Experimental Robotics, Jun. 2012, Quebec City, 1-15.

* cited by examiner

METHODS AND SYSTEM FOR DETECTING CURVED FRUIT WITH FLASH AND CAMERA AND AUTOMATED IMAGE ANALYSIS WITH INVARIANCE TO SCALE AND PARTIAL OCCLUSIONS

CROSS-REFERENCE TO RELATED APPLICATIONS

This application claims the benefit under 35 U.S.C. § 119 of U.S. Provisional Application Ser. No. 61/998,503, filed Jun. 30, 2014, which is incorporated by reference herein in its entirety.

STATEMENT REGARDING FEDERALLY SPONSORED RESEARCH

This invention was made with government support under 2012-67021-19958 awarded by USDA/NIFA. The government has certain rights in the invention.

BACKGROUND OF THE INVENTION

The invention relates generally to a system and method for detecting fruit. More specifically, the invention relates to a system and method for detecting growing fruit using a flash to illuminate the fruit and a camera to capture an image, wherein the image is analyzed to identify the fruit based on an illumination pattern appearing on curved fruit.

The production of high value agriculture—in particular for commodities such as fruit and nuts—requires the high resolution measurement and management of the crop during the growing season to increase efficiency. At present there is limited automated technology that can measure crop volume, density, and other metrics in the field during the growing season; however, there is a great need for accurate and high resolution measurements. Growers can utilize the crop volume and other information to be more precise and efficient with their management practices, leading to an increased yield at harvest. Further, high resolution and accurate fruit detection systems are a fundamental requirement of an automated harvesting system.

Other automated fruit detection methods have distinct drawbacks, such as being sensitive to scale and color, detecting fruit of a single size or limited range of sizes, failing to detect partially occluded fruit, and being unable to detect fruit amongst background scene clutter in the field. All of these drawbacks limit the ability to apply these methods for in-situ operation in orchards or vineyards, for example. It would therefore be advantageous to develop methods and systems that can detect fruit of multiple sizes, in an outdoor environment, and with background clutter.

BRIEF SUMMARY OF THE INVENTION

According to embodiments of the present disclosure is a system and method for detecting fruit through imaging. In some embodiments, the system and method are used for autonomously detecting fruit in a digital image for automated crop measurement or to be used in connection with an automated manipulation system, such as a robotic harvester or precision thinning mechanism. In one embodiment, a flash and camera and automated image analysis are used to find curved fruit among background clutter captured in an image. Lighting upon fruit is controlled with a flash or multiple flashes positioned beside the camera to illuminate the fruit. This leads to a strong specular reflectance at the center of curved fruit, such as apples, grapes, avocados, or many other fruits with a curved exterior. From this center point, where specular reflectance is at a maximum, the pixel intensity decreases steadily toward the edges of the curved fruit. Thus, points of specular reflectance surrounded by curved shaded regions of decreasing intensity are found within the image in locations corresponding to a fruit. The regions can then be evaluated for consistent geometry, thus disambiguating the curved fruit from a cluttered background of leaves. Because the system and method are sufficiently robust to be used in field applications, a row of crops can be imaged and analyzed from a mobile platform mounted on a vehicle.

DETAILED DESCRIPTION OF THE INVENTION

Figure 1:
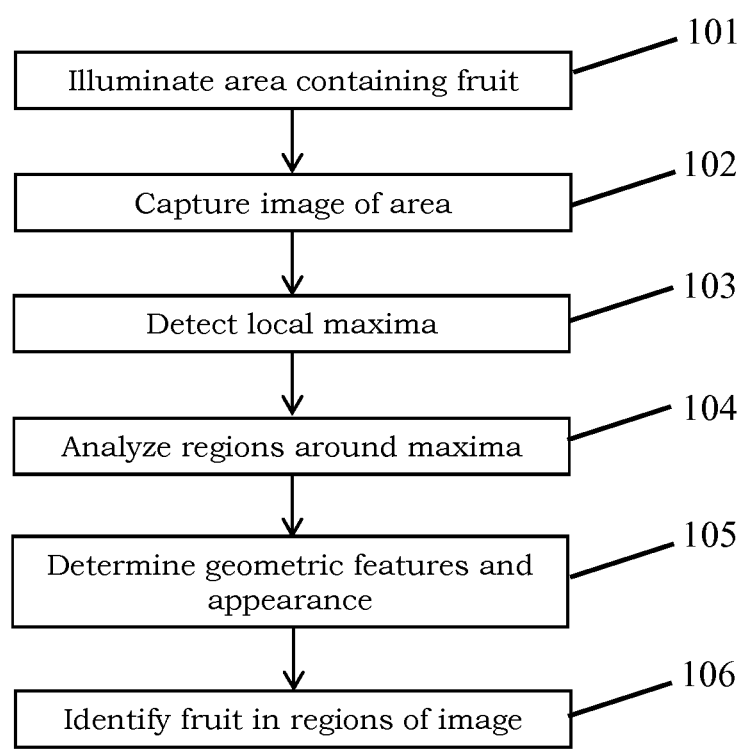
FIG. 1 is a flowchart of the method according to an embodiment of the present invention.

Embodiments of the present invention and its advantages are best understood by referring to the figures. FIG. 1 is a flowchart showing the method of identifying fruit according to the method of one embodiment. At step 101, the fruit is illuminated. The light from an illumination source 801 is reflected from the surface of the fruit and captured by a camera 802 as a digital image at step 102. The system is able to capture and analyze images of fruit growing in the field despite the presence of background clutter and the non-uniform presentation of the fruit. Alternatively, the image can be captured after the harvesting process, for example, if a farmer wants an accurate count of the fruit harvested.

At step 103, local maxima 501 are detected in the image. Local maxima 501 are pixels of high intensity, indicating a reflection from the flash, and are found by first searching an image intensity profile. The maxima 501 are found by analyzing each pixel with respect to its neighboring pixels in the intensity profile. If the intensity of one pixel is greater than all of its neighboring pixels, it is added to a set of candidate pixels. That is, local maxima 501 are a subset of pixels that could indicate the location of a fruit depending on further analysis.

Almost all of areas of the image corresponding to the location of the fruit in the image will contain an area of reflection. By detecting the local maxima 501, the system and method minimize the number of pixels that have to be further analyzed to detect fruit, greatly improving efficiency and speed. For example, in a 10 megapixel digital image, there are 10 million individual pixels. A significant amount of resources would have to be used to analyze the features contained in the image data of each one of those 10 million pixels. In contrast, an image of a grapevine, for example, may contain a few thousand local maxima 501, meaning only those few thousand candidate pixels will be further analyzed. Several hundred fruits might be detected from those few thousand candidate pixels. With such improvements in efficiency, the system and method of the present invention can analyze a crop in real-time as the images are acquired.

Another benefit of detecting local maxima 501 is being able to detect fruit with an unknown size or diameter. For any size fruit, the local maxima 501 will be points near the center of the fruit. In contrast, methods that use edge detection must utilize information about the expected size of the fruit prior to image analysis. The advantage of the present method is that fruit can be detected throughout the growing season as size changes, or different varieties of fruit having different sizes can be detected without the need to reprogram or recalibrate.

Once the local maxima 501 are detected, the areas around each individual local maximum 501 are analyzed to detect a pattern at step 104. At this step, the area around each maximum is searched to find bands or rings corresponding to a certain intensity level. For example, a first ring could include pixels that are 95%-99.9% of the local maximum 501 intensity. A second ring could include pixels that are 90%-94.9% of the local maximum 501. Thus, the first ring includes pixels having an intensity less than the maximum but greater than a threshold of 95% and the second ring includes pixels that have an intensity less than the first ring but greater than a second intensity threshold of 90%. Although a fixed drop is used in this example for each band, the drop could vary with each band. In addition, shiny fruit might have tighter bands whereas matte fruit could have larger bands.

Since each individual pixel in an image can belong to only a single piece of fruit, each pixel is analyzed with respect to only one local maximum 501. In other words, once a first ring or a series of rings around a maximum 501 is found, an adjacent maximum 501 cannot contain the same pixel. As a result, overlapping maxima are eliminated.

To have robustness for partial occlusion—where the fruit is partly obscured by a leaf or other plant material—the analysis of the region around the maxima 501 is conducted separately in individual angular sectors in an alternative embodiment. In this embodiment, an area of pixels adjacent to the local maximum 501 having a certain intensity are found. However, rather than finding all pixels surrounding the local maximum 501, only those pixels within an angular sector adjacent to the local maximum 501 and found. An example of an intensity profile in an angular sector is shown in column 2 of FIG. 6.

For each angular sector, a first band of pixels are found having a certain intensity as compared to the intensity of the maximum point 501. A second iteration follows by finding a second band of pixels with a lower intensity than the first band of pixels. This process repeats until a pre-determined number of bands have been found, each band having pixels with a lower intensity than the previous band.

At step 105, the geometric and appearance features of the rings (or bands in the angular sector) are determined. In a broad sense, the reflection of light from the surface of a curved fruit will create a uniform, circular pattern. To detect this pattern, the distance of each pixel at the boundary of an intensity ring from the local maximum 501 is calculated. If the ring or band is arc shaped, each pixel at the edge of a ring or band should have a similar distance. Elongated bands can indicate an object other than a fruit. For example, a linear band would be present on the stem of a vine. If the intensity of each ring fall within a pre-determined range and the rings generally conform geometrically, then the local maximum 501 is identified as a region containing fruit at step 105.

Figure 2:
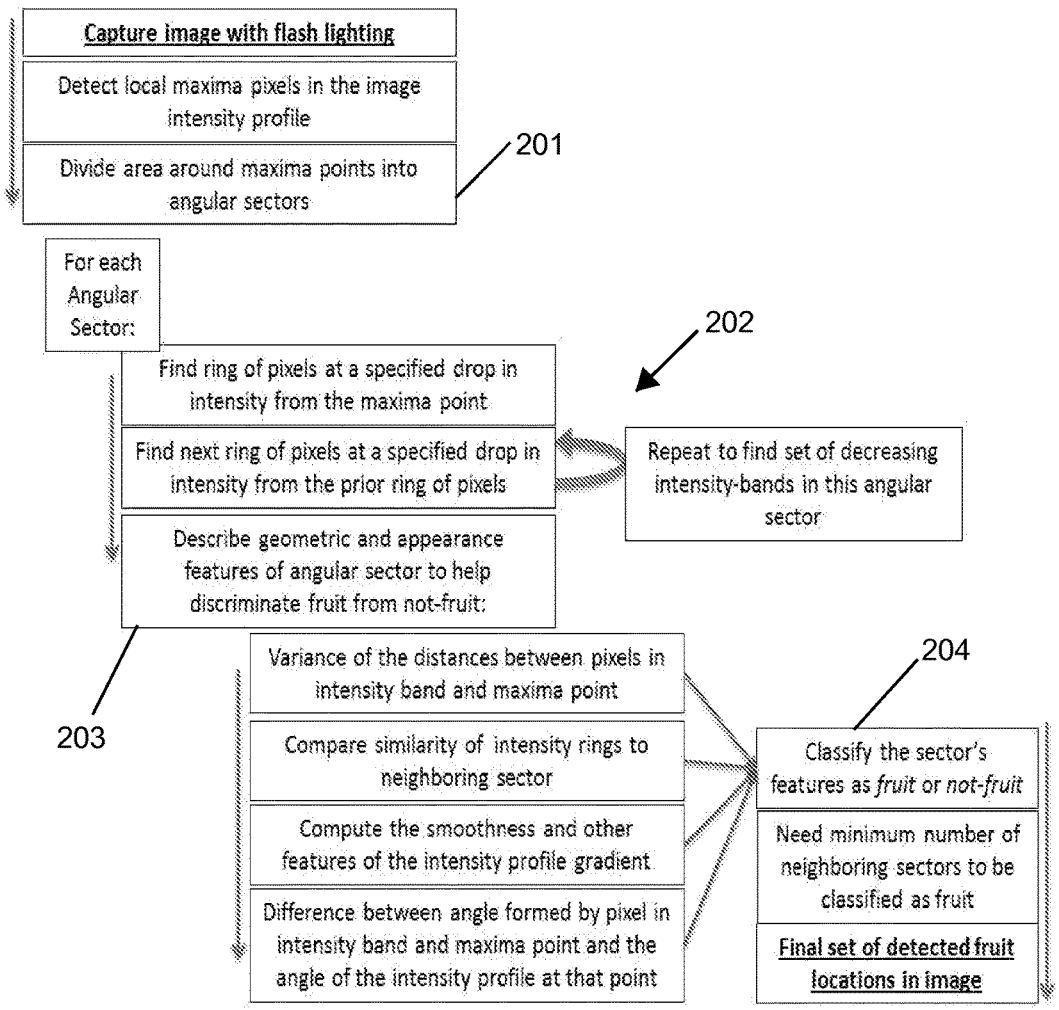
FIG. 2 is a flowchart of the method according to an alternative embodiment of the present invention.

FIG. 2 is a flowchart showing a method according to an alternative embodiment, the embodiment being more sensitive for partially occluded fruit. In this method, the area around maximum points 501 is divided into angular sectors at step 201. For each angular sector, bands of pixels having a drop in intensity are identified at step 202. The first band will have pixels with an intensity less than the maximum 501 but greater than a threshold, which is a fraction of the maximum intensity. A second band will have pixels with an intensity less than the first band, but greater than a second threshold. The process repeats to find a set of decreasing intensity bands in the angular sector.

Next, at step 203, the geometric and appearance features of the angular sector are described to help discriminate the fruit from other matter in the image. For example, this analysis can include determining the distances between pixels in the intensity band and the maximum point 501, comparing the similarity of intensity rings to neighboring sectors, computing the smoothness and other features of the intensity profile gradient, and finding the difference between an angle formed by a pixel in the intensity band and maximum point 501 and the angle of the intensity profile at that point. At step 204, these geometric and appearance features of the sectors are classified as fruit either with simple thresholds set empirically or using a machine-learning algorithm that classifies the set of features using prior-data collected of fruit and non-fruit regions. However, for the location to be classified as fruit, there should be a minimum number of similar neighboring sectors classified as fruit. This number of sectors can be varied depending on a trade-off of between how robust to partial-occlusions and how sensitive to false-detections.

Figure 3:
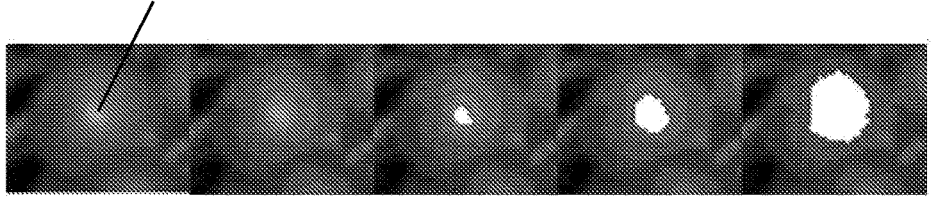
FIG. 3 is an image showing an iterative process to detect shading on curved fruit according to the method of one embodiment.

FIG. 3 is a series of images showing the iterative process of identifying the curved surface of a fruit, as described in steps 103 and 104. In the first image, the reflectance maximum 501 is identified in the center of the fruit, which corresponds to step 103. In the subsequent image, a ring of decreased intensity pixels is identified around the center maximum 501, corresponding to step 104. In the next image, a second ring of decreased intensity pixels is located. The fourth and fifth images repeat the process, locating the third and fourth rings of decreased intensity.

Depending on the application or desired level of accuracy, the number of decreased intensity rings identified can be adjusted. For example, a fruit with less reflective background clutter may only need two rings to accurately identify the fruit, whereas reflective background clutter or field conditions may require five rings to reduce false positives.

Figure 4:
FIG. 4 is a pair of images showing a grapevine (top) and the same grapevine with individual berries identified (bottom).

FIG. 4 is a sample image of a grapevine. As shown in the top image, several fruit clusters, each with multiple berries, are present on the vine. In addition, leaves stems, and other objects with similar colors to the grape clusters are present in the image. FIG. 4 further shows that the berries are not uniform in size. The bottom image of FIG. 4 shows the berries identified and the clusters outlined, using an embodiment of the present invention. Other points 501 of maximum reflectance were indicated, but not identified as fruit because those points 501 did not have rings of decreasing intensity surrounding the maximum point 501. For example, a leaf will have shading follow a linear path due to the flat surface contour of the leaf.

Figure 5:
FIG. 5 is a pair of images showing a grape cluster (left) and the same cluster with individual berries identified (right).

FIG. 5 is another example of the type of image, which shows grapes growing on a vine, captured by the system. In FIG. 5, a pair of images of a single grape cluster is presented. The image on the left shows the raw image, as captured by the camera 802 of the present invention. The image on the right shows individual berries identified with square overlays. Also shown in the image are berries in the background, behind the main cluster, properly identified as well.

Figure 6:
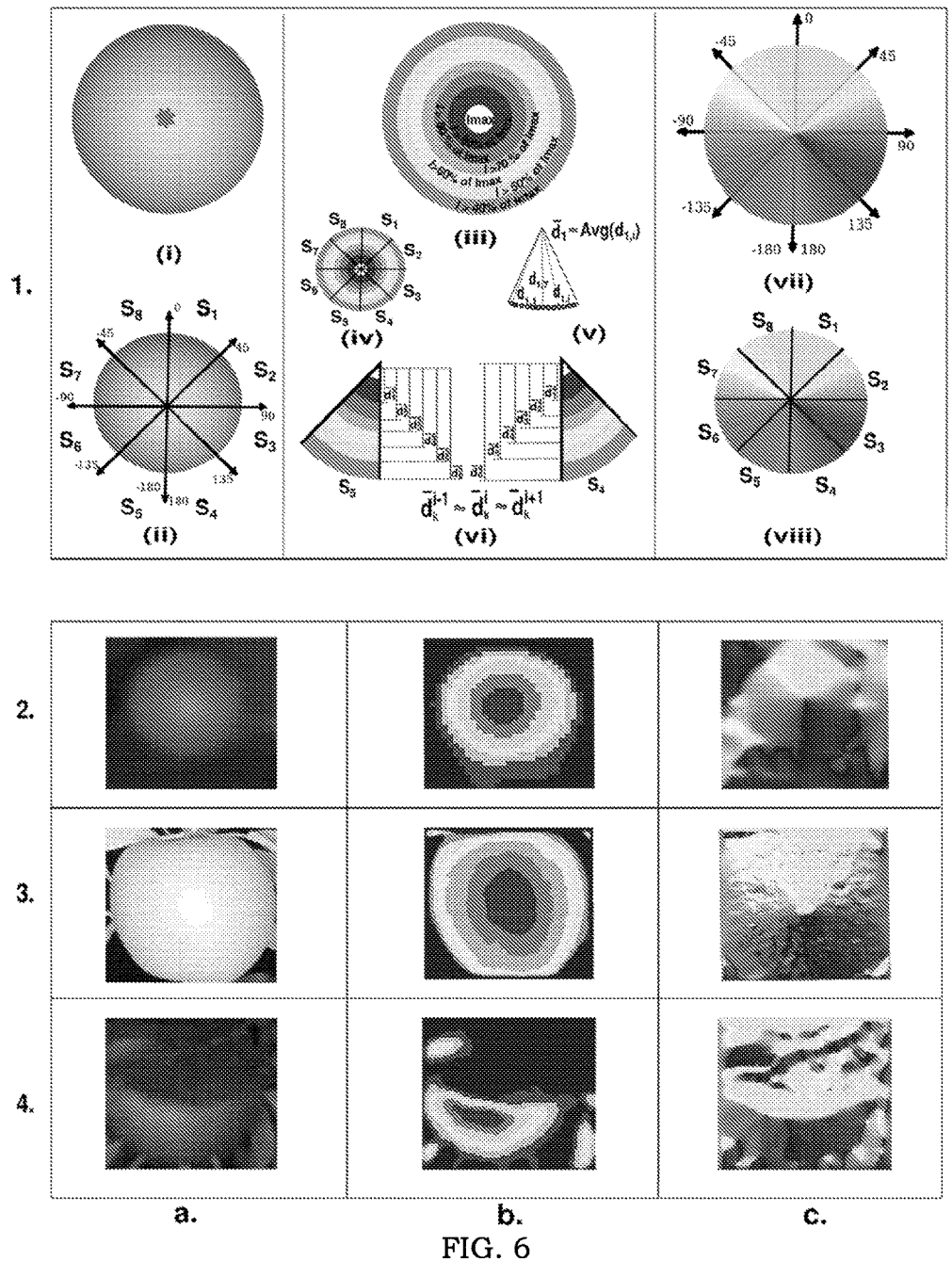
FIG. 6 shows a visualization of the detection process.

FIG. 6 illustrates several steps of the detection algorithm utilized in the method described in FIG. 2. The first column shows various images of fruit, beginning with an artificial depiction of a perfectly round fruit at the top of the column, then a grape in the next row, followed by an apple, and then a partially occluded apple. The local maxima 501 are visible on the fruits shown in the first column as bright spots at the center of the fruits. From this maximal intensity point 501, the intensity gradually drops away from the center and towards the edges of the fruit.

The second column of FIG. 6 shows bands of decreasing intensity surrounding the local maximum point 501. Depending on the particular application, the threshold for a ring can be set as a fraction of the maximum. For example, as shown in the second column of FIG. 6, the first ring surrounding the maximum is an area of pixels having an intensity between 90% of the maximum and just less than the maximum. In the top row, the ring is perfectly circular. However, for the images of real fruit, the rings are slightly irregular. For example, in the bottom row, the partially occluded fruit shows a crescent-shaped intensity pattern because the top half of the apple is obscured by a leaf. For this reason, angular segments can be used to detect the partially occluded fruit rather than annular sections.

The top row of the center column in FIG. 6 shows how the area surrounding the fruit is segmented into angular sections. For each intensity band in a sector, the average of the radii between each pixel forming the extremes of the band and the center are computed. The standard deviations of each point on the perimeter of the band should be small if each point on the perimeter has a similar distance to center. Also the average radius of an intensity band should almost be the same to a neighboring sector, if the bands are arc shaped.

The orientation pattern formed on the fruit surface and centered at the maximal point 501 can also segmented into angular sectors. The difference between the gradient orientation formed at each point in a sector and the angle formed between the point and the center is computed. For smooth round fruit, this difference is very small.

Figure 7:
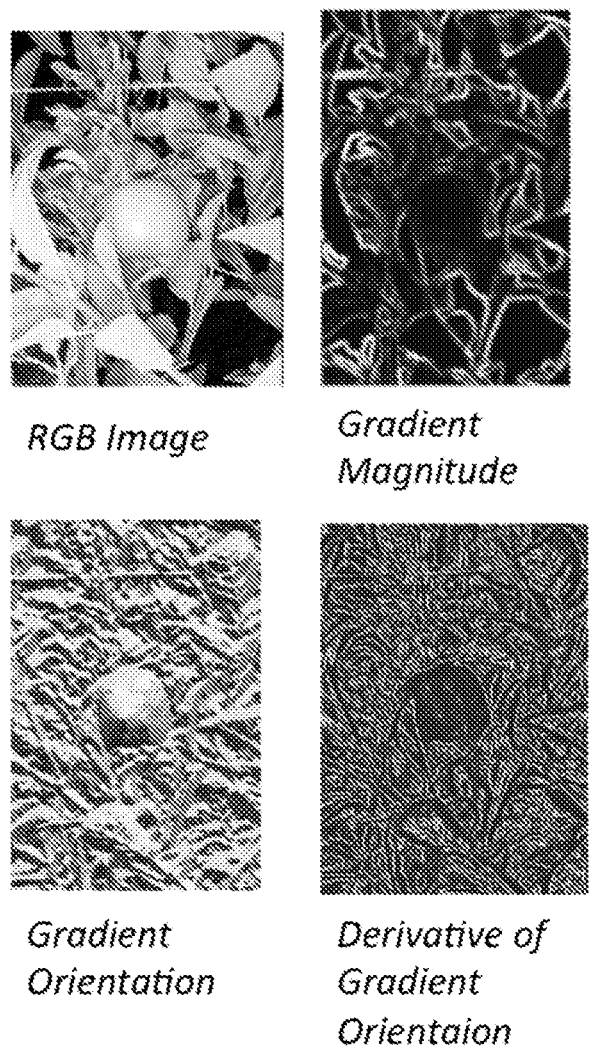
FIG. 7 is a series of images showing certain metrics used for detection of fruit.

FIG. 7 is a series of images depicting how certain types of image data is used to differentiate fruit from background clutter. In the top right image, which shows gradient magnitude, leaf contours are captured accurately but the contour of the fruit is not. The lower left image depicts gradient orientation and shows the fruit at the center of the image. The smoothness of the fruit can be identified explicitly by measuring derivatives of the gradient orientation. The derivative of gradient orientation image is shown in the lower right corner. This feature information, which is captured in the image and forms part of the image data, is useful in differentiating fruit from a cluttered background, particularly when the fruit is a similar color to the background.

Figure 8:
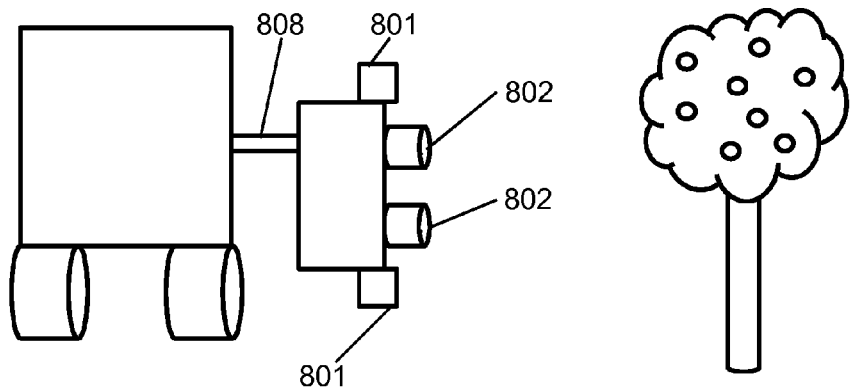
FIG. 8 is a block diagram of the system according to one embodiment.

FIG. 8 is a block diagram of the system. Shown in the image is a camera 802, or a pair of cameras 802 in the preferred embodiment, and a flash system 801. The flash 801 is positioned beside the camera 802 parallel to the camera's optical axis. In this orientation, the maxima of reflectance are very near the center of the fruit as presented in the image. If the fruit were lit with ambient light only, the maxima may be at the top of the fruit, dependent on the position of the sun or other lighting. With the maxima near the center, the iterative process of finding decreasing light intensity around the center can be accomplished.

In one embodiment, the camera 802 is mounted about 0.9 and 1.5 m from the fruiting zone in the example of grape detection and depends on the size of the fruiting zone for the particular vineyard. For detection of apples growing in a tree, the distance from the camera 802 to the tree will be significantly larger because the fruiting zone covers a much larger area. Illumination 801 is placed directly to the side of the camera to reduce shadowing.

Suitable equipment can include, for example, 24 MM F/2.8 D AF NIKKOR lens is used in conjunction with a PROSILICA GE4000 camera 802. In this example, a pair of cameras 802 is mounted facing sideways on a vehicle viewing the fruit. Two Einstein™ 640 mono flashlights 801 are mounted on both sides of the cameras 802.

In one embodiment, the fruit detection system is mounted on a vehicle by a mount 808. In this embodiment, a farmer can drive along a row of crops and capture a series of images of the growing fruit. Automatic image registration addresses the issue of double counting or undercounting of fruit. For example, a first image may show five clusters of grapes. A subsequent image may show two of the clusters from the first image in addition to four new clusters. Thus, the first image shows five clusters and the second shows six clusters, for a total of eleven clusters. However, two of the clusters were double counted, meaning there were only nine unique clusters imaged in the two sequential images.

To prevent this issue, which would cause errors in count and yield estimation, the system and method register the location of each image. From the registration information, individual fruits can be identified by the following process. First, the detections from each image from a crop row are back-projected onto a local fruit wall, which is a virtual representation of crop row created from the image data. The entire length of the row is then partitioned into short segments, such as 0.5 m in length for example. A segment that contains projected fruit detections from more than one image is a region in which camera views overlapped. The detections from the image with the most detections lying in the segment are retained, and detections in the segment from the other images are discarded. This heuristic is used to choose the image where the effect of occlusions was minimum. Taking the maximum image measurement rather than attempting to merge all image measurements together avoids the issue of attempting to do fine registration while fruit is moving from wind or the vehicle pulling at the vine. Each segment now has a visible fruit count associated with it, and this can be aggregated over rows.

Figure 9:
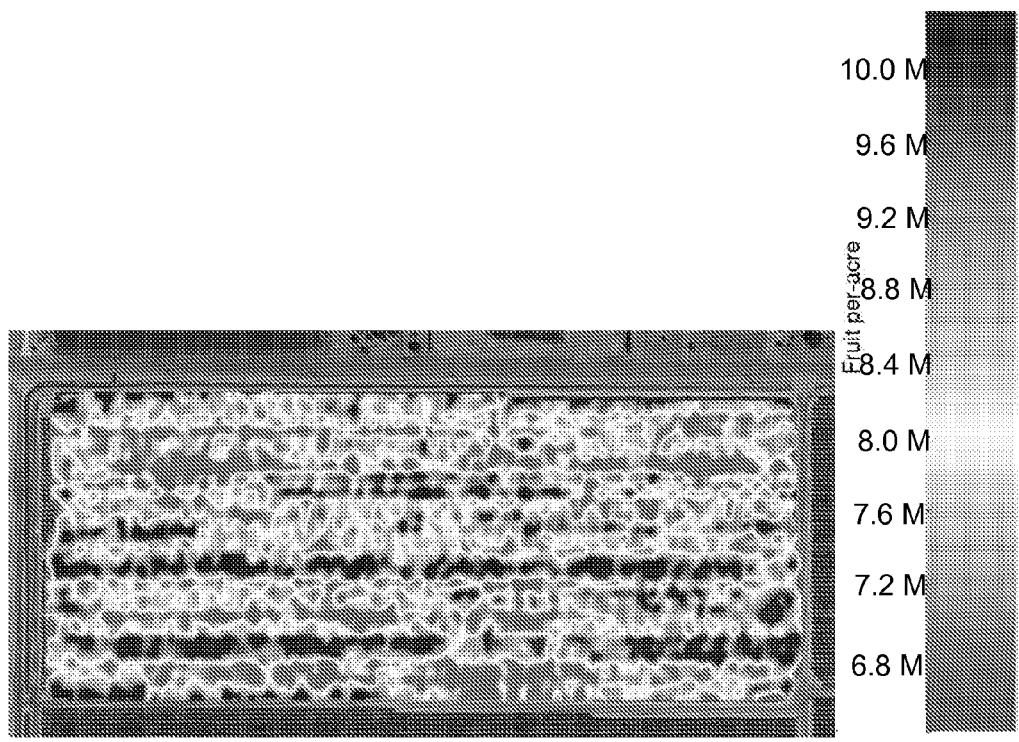
FIG. 9 is a yield density map created as a result of the detection system and method.

Another benefit of registering the location of each image is that yields for particular locations in the field can be estimated. Location can be estimated from GPS. Alternatively, location can be determined using visual odometry. Visual odometry estimation is gathered with a PointGrey BumbleBee® 2 stereo vision camera mounted to the vehicle pointed down the row. The data collected by the stereo vision camera is used with a visual odometry algorithm to estimate the position of the vehicle along the row. To maintain synchronization of the cameras and flashes, the cameras are triggered by external pulses. The images are captured at 5 Hz for a vehicle driven at 5.4 km/h, which is a similar speed to a pesticide spraying tractor and faster than a machine harvester. FIG. 9 is a sample crop yield density map created by the system and method of the present invention.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

What is claimed is:

1. A method for detecting fruit, comprising:
    (a) illuminating an area containing a fruit;
    (b) capturing an image of the illuminated area;
    (c) detecting a local maximum located in a region of the image, wherein the local maximum is a pixel having a first intensity and corresponds to an area of specular reflection;
    (d) identifying a first ring of pixels surrounding the local maximum;
    (e) labeling the region as a location of the fruit if:
        the intensity of the first ring is less than the first intensity but greater than a threshold intensity, and
        a shape of the first ring matches a geometric profile.

2. The method of claim 1, wherein the threshold intensity is a fraction of the first intensity.

3. The method of claim 1, further comprising:
    identifying a second ring of pixels surrounding the first ring, wherein the second ring and the first ring are concentric;
    wherein labeling the region as the location of the fruit occurs only if:
        the intensity of the first ring is less than the first intensity but greater than a threshold intensity,
        the an intensity of the second ring is less than the intensity of the first ring, but greater than a second threshold intensity, and
        the first ring shape and a second ring shape matches the geometric profile.

4. The method of claim 1, further comprising:
    detecting a second local maximum located in a region of the image; and
    repeating steps (d) and (e) for the second local maximum to detect a second fruit.

5. The method of claim 1, further comprising:
    illuminating a second area adjacent to the area;
    capturing a second image of the second illuminated area; and
    repeating steps (c) through (e) for the second image, wherein the image and the second image are reconciled to prevent a miscount of fruit.

6. A method for detecting partially occluded fruit, comprising:
    illuminating an area containing a fruit;
    capturing an image of the illuminated area;
    detecting a local maximum located in a region of the image, wherein the local maximum is a pixel having a first intensity and corresponds to an area of specular reflection;
    identifying a ring of pixels surrounding the local maximum;
    segmenting the ring into a series of angular sectors;
    identifying a first band of pixels in one of the series of angular sectors;
    labeling the region as a location of the fruit if:
        the intensity of a first band of the angular sector is less than the first intensity but greater than a threshold intensity, and
        a shape of the first band of the angular sector matches a geometric profile.

7. The method of claim 6, further comprising:
    disambiguating the fruit from a background.

8. The method of claim 7, wherein the step of disambiguating the fruit from a background comprises:
    determining a distance between a pixel in the first band and the local maximum;
    determining a second distance between a second pixel in the first band and the local maximum; and
    calculating a variance between the distance and the second distance to generate a geometric feature.

9. The method of claim 7, wherein the step of disambiguating the fruit from a background comprises:
    comparing a similarity of intensity between neighboring sectors in the series of sectors.

10. The method of claim 7, wherein the step of disambiguating the fruit from a background comprises:
    computing a smoothness of an intensity profile gradient.

11. The method of claim 7, wherein the step of disambiguating the fruit from a background comprises:
    calculating a difference between an first angle formed by a pixel in the first band and the local maximum and a second angle based on an intensity profile for the pixel.

12. A system for detecting fruit, comprising:
    a camera having an optical axis, wherein the camera captures an image of fruit;
    an illumination source mounted in proximity to the camera, wherein a path of illumination from the illumination source is parallel to the optical axis of the camera;
    a memory including computer-executable instructions; and
    a processor coupled to the memory to execute the instructions, the instructions when executed implementing a process for detecting fruit, the process comprising:
        detecting a local maximum belonging to a region in the image, wherein the local maximum is a pixel having a first intensity and corresponds to an area of specular reflection;
        identify a first ring of pixels surrounding the local maximum;
        labeling the region as a location of fruit if:
            the intensity of the first ring is less than the first intensity but greater than a threshold intensity, and
            a shape of the first ring matches a geometric profile.

13. The system of claim 12, wherein the illumination source is an electronic flash unit.

14. The system of claim 12, further comprising a vehicle mount.

15. The method of claim 1, wherein the geometric profile is determined by calculating the distance of each pixel at a boundary of the first ring from the local maximum.

16. The method of claim 6, wherein the geometric profile is determined by calculating the distance of each pixel at a boundary of the first band from the local maximum.

17. The system of claim 12, wherein the geometric profile is determined by calculating the distance of each pixel at a boundary of the first ring from the local maximum.

* * * * *